(12) United States Patent
Eriksson

(10) Patent No.: US 8,959,518 B2
(45) Date of Patent: Feb. 17, 2015

(54) WINDOW-BASED SCHEDULING USING A KEY-VALUE DATA STORE

(75) Inventor: Johan Eriksson, Orebro (SE)

(73) Assignee: BMC Software, Inc., Houston, TX (US)

( * ) Notice: Subject to any disclaimer, the term of this patent is extended or adjusted under 35 U.S.C. 154(b) by 213 days.

(21) Appl. No.: 13/436,249

(22) Filed: Mar. 30, 2012

(65) Prior Publication Data

US 2013/0263140 A1 Oct. 3, 2013

(51) Int. Cl.
*G06F 9/46* (2006.01)

(52) U.S. Cl.
USPC .......................................................... 718/102

(58) Field of Classification Search
None
See application file for complete search history.

(56) References Cited

U.S. PATENT DOCUMENTS

| 2005/0050543 | A1* | 3/2005 | Ogus et al. ..................... 718/100 |
| 2005/0076043 | A1* | 4/2005 | Benedetti et al. ............. 707/100 |
| 2011/0271283 | A1* | 11/2011 | Bell et al. ..................... 718/102 |
| 2012/0254277 | A1* | 10/2012 | Ho et al. ....................... 709/201 |
| 2013/0080480 | A1* | 3/2013 | Mao et al. ..................... 707/803 |

OTHER PUBLICATIONS

"Quartz Scheduler 2.1.x Documentation", Quartz, Aug. 11, 2011, 140 pages.

* cited by examiner

*Primary Examiner* — Emerson Puente
*Assistant Examiner* — Dong Kim
(74) *Attorney, Agent, or Firm* — Brake Hughes Bellermann LLP

(57) ABSTRACT

A scheduling system for scheduling executions of tasks within a distributed computing system may include an entry generator configured to store, using at least one key-value data store, time windows for scheduled executions of tasks therein using a plurality of nodes of the distributed computing system. The entry generator may be further configured to generate scheduler entries for inclusion within a time window of the time windows, each scheduler entry identifying a task of the tasks and an associated schedule for execution thereof. The system may further include an execution engine configured to select the time window and execute corresponding tasks of the included scheduler entries in order.

17 Claims, 6 Drawing Sheets

WINDOW-BASED SCHEDULING USING A KEY-VALUE DATA STORE

TECHNICAL FIELD

This description relates to task scheduling.

BACKGROUND

Many software applications require scheduled executions of tasks. For example, a task may be scheduled for a single execution at a specific time, or, in other examples, one or more tasks may be scheduled for recurring execution (e.g., in a periodic or aperiodic fashion) over a period of time. Further, such scheduling (and association executions) of tasks may be implemented in a distributed manner, using a plurality of computing nodes.

However, existing scheduling techniques may require the purchase, installation, and/or implementation of corresponding scheduling components, which may be difficult, time-consuming, and/or expensive to integrate with a particular software application requiring task scheduling. Moreover, such existing scheduling techniques may suffer from an inability to recover efficiently from node failures that may occur during task execution, or, alternatively, may require undesirable or unacceptable quantities of computing resources in order to ensure an acceptable level of recovery. Thus, existing scheduling technologies fail to provide reliable, scalable task scheduling in a manner which leverages existing/available infrastructure to ensure ease of use across a wide variety of applications and platforms.

SUMMARY

According to one general aspect, a scheduling system for scheduling executions of tasks within a distributed computing system may include instructions stored on a non-transitory computer readable storage medium and executable by at least one processor. The system may include an entry generator configured to cause the at least one processor to store, using at least one key-value data store, time windows for scheduled executions of tasks therein using a plurality of nodes of the distributed computing system, and further configured to cause the at least one processor to generate scheduler entries for inclusion within a time window of the time windows, each scheduler entry identifying a task of the tasks and an associated schedule for execution thereof. The system may further include an execution engine configured to cause the at least one processor to select the time window and execute corresponding tasks of the included scheduler entries in order.

According to another general aspect, a method may include storing, using at least one key-value data store, time windows for scheduled executions of tasks therein using a plurality of nodes of the distributed computing system. The method may include generating scheduler entries for inclusion within a time window of the time windows, each scheduler entry identifying a task of the tasks and an associated schedule for execution thereof. The method may also include selecting the time window and executing corresponding tasks of the included scheduler entries in order.

According to another general aspect, a computer program product may include instructions recorded on a non-transitory computer readable storage medium and configured to cause at least one processor to store, using at least one key-value data store, time windows for scheduled executions of tasks therein using a plurality of nodes of the distributed computing system. The instructions, when executed, may be further configured to generate scheduler entries for inclusion within a time window of the time windows, each scheduler entry identifying a task of the tasks and an associated schedule for execution thereof. The instructions, when executed, may be further configured to select the time window and executing corresponding tasks of the included scheduler entries in order.

The details of one or more implementations are set forth in the accompanying drawings and the description below. Other features will be apparent from the description and drawings, and from the claims.

DETAILED DESCRIPTION

Figure 1:
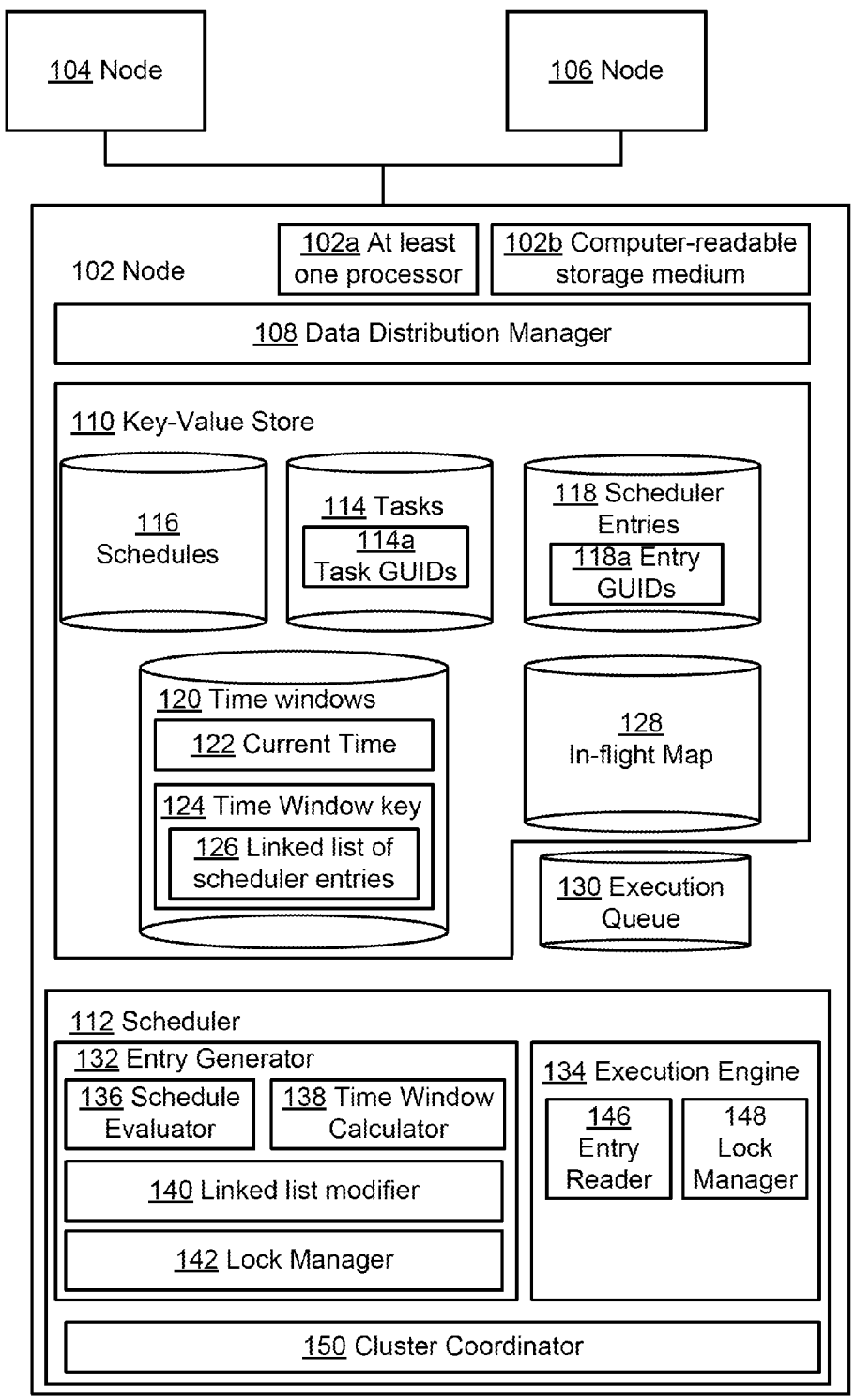
FIG. 1 is a block diagram of a system for window-based scheduling using a key-value data store.

FIG. 1 is a block diagram of a system 100 for window-based scheduling using a key-value data store 110. In the example of FIG. 1, nodes 102, 104, 106 represent a distributed network of computing nodes which may be used to perform the scheduling and execution of tasks. More particularly, as shown, the node 102 illustrates that one or more of the nodes 102-106 may include some or all of the illustrated components of the node 102, including, for example, a data distribution manager 108, the key-value data store 110, and a scheduler 112.

Thus, in the example of FIG. 1, the system 100 may be utilized to schedule and execute software tasks across any and all of the available nodes 102-106. Moreover, since such scheduling and execution utilizes the data distribution manager 108 and the key-value store 110, as explained in more detail below, the scheduling and execution of tasks in a distributed manner may be implemented in an inexpensive, scalable manner, without requiring significant computing resources or excessive efforts to ensure compatibility of associated scheduling operations with particular software applications (and associated hardware/software platforms).

For example, the data distribution manager 108 may be configured to transmit, communicate, or otherwise distribute data among the various nodes 102-106 of the system 100. For example, the data distribution manager 108 may be configured to distribute data with a certain level of redundancy, so as to thereby ensure reliable availability of the data in the event of one or more node failures. In this regard, it may be appreciated that the data distribution manager 108 may be configured to implement any number of conventional or standard features associated with fast, efficient, secure, cost-effective data distribution within a distributed network of nodes, some of which are referenced or described below. Nonetheless, it also may be appreciated that, for the sake of clarity and conciseness, not all such features are described herein, but would be apparent of one of skill in the art.

In implementing the above and related functions, the data distribution manager 108 may store and access data using the key-value store 110. By itself, the key-value store 110 may be understood to include many well-known characteristics, some of which are described in detail herein. For example, the key-value store 110 may be configured to store and access records and associated data values through the use of an appropriate hash function in conjunction with a unique key associated with the record/data value in question. In other words, the use of such hash mapping techniques are known to identify a unique or almost unique location within the key-value store 110, for use in the storage and/or retrieval of data values. The key-value store 110 thus provides fast, efficient data storage and retrieval, in a manner that is scalable, and that is compatible with a wide variety of software applications and platforms.

As with the data distribution manager 108, and as referenced above, many features and functions of the key-value store 110, by itself, as well as in combination or interaction with the data distribution manager 108, may be well known. For example, various techniques are known to be useful in enabling interactions between the data distribution manager 108 and the key-value store 110. For example, the data distribution manager 108 may enable a locking mechanism with respect to the key-value store 110, by which write operations to the key-value store 110 may be partially or completely suspended or locked during a modification of data stored using the key-value store 110, so as to ensure against a possibility of multiple, overlapping, or conflicting write operations with respect to the same or related data stored in the key-value store 110. To the extent necessary or helpful to understand operations of the system 100 of FIG. 1, such features may be described or referenced in the following description. However, it also may be appreciated that, again for the sake of clarity and conciseness, not all such features are described in detail herein, but would be understood by one of ordinary skill in the art to be potentially included in, or associated with, the key-value store 110.

Thus, in the example of FIG. 1, the scheduler 112 may be configured to utilize the data distribution manager 108 and the key-value store 110 to store and access data as described herein, so as to thereby schedule fast, efficient executions of tasks. Moreover, the scheduler 112 may be configured to do so in a manner that is widely scalable, and easily implementable by system administrators with access to the data distribution manager 108 and the key-value store 110.

In the example of FIG. 1, the key-value store 110 may be utilized to store various data and data structures. For example, as shown, the key-value store 110 may be utilized to store a plurality of tasks 114, where each stored task represents data and rules related to a job to be executed. In this regard, it may be appreciated that the term task may be representative of virtually any functionality of a software application or service, or any associated hardware/software platform. More generally, tasks may describe jobs to be executed externally, e.g., by human or machine task performers.

In the example of FIG. 1, each such task may be associated with a Global Unique Identifier (GUID), illustrated in FIG. 1 as task GUID 114a. That is, each task GUID 114a may be understood to represent a unique key associated with its corresponding task, and utilized by the key-value store 110 in storing and/or accessing the corresponding task data.

The key-value store 110 may also be used to store a plurality of schedules 116. In this regard, the schedules 116 may be understood to represent virtually any specification or other description describing one or more time periods in which a task may be executed. For example, a schedule may specify a single time of execution, a recurring or periodic set of execution times (e.g., at a specific time on the same day of each week), or at periodic times. In these and other examples, schedules may be specified with respect to particular times, days, or dates, or may be indirectly specified with respect to some event or requirement. For example, the schedule may specify execution of a task in response to a detection of some defined event, or may specify non-execution of a task during a specified block-out window of time.

In general, in the example of FIG. 1, each task is associated with a corresponding schedule of the schedules 116, and each such combination of a task and its corresponding schedule is stored as a separate, unique data record, referred to herein as a scheduler entry, and illustrated as scheduler entries 118 in the example of FIG. 1. That is, for example, a given task of the tasks 114 may be associated with one or more of the schedules 116. Conversely, any one of the schedules 116 may be designated to govern execution times of one or more tasks of the tasks 114. As shown, each such resulting scheduler entry, or entry, also may be assigned a unique identifier, illustrated in the example of FIG. 1, as entry GUID 118A.

As referenced above, the system 100 may include a large number of distributed computing nodes, connected by one or more networks, and represented in the simplified example of FIG. 1 by the three nodes 102-106. As also referenced above, although not specifically illustrated in the example of FIG. 1, any of these nodes may include and implement some or all of the components 108, 110, 112 which are illustrated and described in FIG. 1 with respect to the node 102. Thus, for example, it may be appreciated that data stored or associated with the tasks 114, the schedules 116, and the scheduler entries 118 may also be distributed, stored, accessed, or otherwise utilized, in whole or in part, by two or more of the various nodes of the distributed system 100.

In this context, the scheduler 112 (and/or corresponding instances thereof at the nodes 104, 106) may be configured to schedule execution of the tasks 114 in accordance with their corresponding schedules, by scheduling the execution of each task at a corresponding node which is the most available and/or most effective node to perform such execution at a corresponding time specified by the associated schedule of the task in question. In this way, the nodes 102-106 of the distributed system 100 may be utilized, as a whole, to execute the tasks 114 in a fast, efficient manner, and in accordance with the relevant task schedules, so that the tasks are completed on time.

Thus, it may be appreciated that such scheduling and execution of tasks in the distributed system 100 may require movement of data within and among the various nodes 102-106. In this regard, it may be appreciated that the data distribution manager 108 and the key-value store 110 may utilize various known techniques for optimization of such data transfers/access as such. For example, it may occur that data associated with the task 114 may be relatively large in amount, so that it may be impractical or undesirable to transfer an entirety of such task data, unless such transfer is required for actual execution of the related task. Consequently, the scheduler entries 118, each of which includes a task and corresponding schedule, may simply identify a corresponding task through the use of a pointer or other reference to the corresponding task GUID of the task 114, rather than by separately storing and/or accessing the actual task data. In this way, the scheduler entries 118 may specify corresponding tasks, while minimizing resources required for the storage and/or transfer of associated task data.

Further in the example of FIG. 1, time windows 120 represent data records defining user-defined blocks of time. As described in detail herein, the time windows 120 may be utilized to subdivide and otherwise define an order and manner of execution for the scheduler entries 118.

In the example of FIG. 1, each of the time windows 120 may be specified as a particular interval of time, such as, e.g., a specific minute. However, it may be appreciated that the time windows 120 may represent any user-defined blocks of time. For example, it may be appreciated that all such blocks of time may be specified in manners which are consistent with definitions or other specifications of time utilized in defining the schedules 116. Thus, as also referenced above in the context of the schedules 116, the time windows 120 may be specified with respect to external events or other criteria, as long as the time windows 120 each define, directly or indirectly, the time in which subsets of the scheduler entries 118 may be included for execution of associated tasks within the corresponding time slot.

Within the time windows 120, a current time 122 represents a particular data record used to indicate a starting point for scheduled task executions. For example, in many cases, the current time 122 may literally represent or designate a start time of task executions as a current point in time. In other examples, however, the current time 122 may generally refer to a time in which task execution should begin, where it may be appreciated that such time may, in practice, lag behind an actual current time, such as when a heavy system load of the system 100 causes task executions to run temporarily behind schedule. Additional features, characteristics and uses of the current time 122 are described below, e.g., with respect to FIG. 3.

Further within the time windows 120, a number of time windows may be included, represented in the example of FIG. 1 by a time window key 124. That is, the time window key 124 represents a key of the key-value store 110 which is associated with, and identifies, a corresponding single block or segment of time designated as one of the time windows 120. For example, in the examples above in which the time windows 120 each designate a specific minute, the time window key 124 and associated data may include a head-entry stored using the time stamp of the beginning of the time window as the time window key 124 (e.g., such a time stamp of a particular minute may be represented as "2011-11-25 15:32:00").

Then, this head entry may be understood to represent a first entry of a linked list of scheduler entries 126, which holds all scheduler entries which fall into the associated time window (e.g., for the just-mentioned time window, the linked list 126 would include any scheduler entry and associated task to be executed between 2011-11-25 15:32:00 and 2011-11-25 15:32:59). Thus, each of the scheduler entries 118 is included within a linked list of scheduler entries associated with a particular time window of the time windows 120.

The time windows 120 thus represent composite data structures defining time periods in which tasks are to be executed in accordance with corresponding task schedules. As time advances and individual time windows of the time windows 120 are reached, actual execution of tasks specified by time window may proceed. For example, as described in more detail below, an in-flight map 128 may be utilized to read scheduler entries from a particular linked list of an associated time window, so that the in-flight map 128 references some or all of the scheduler entries of the linked lists of the time window in question. In other words, as described in more detail below, the in-flight map 128 may be implemented using the distributed key-value store 110 and utilized to store a certain number of entries at any given time, whereupon specific scheduler entries may be loaded into an execution queue 130 for an actual order of execution thereof using a particular (available) node of the nodes 102-106, as described in more detail below. In this way, the distributed in-flight map 128 may thereby provide redundancy in case of a node failure of such a node(s) that has previously loaded data in-memory for execution.

In operation, as referenced above and described in more detail herein below, the scheduler 112 may generally be configured to create, access, modify, or otherwise utilize the data stored using the key-value store 110, and in conjunction with various features and functions of the data distribution manager 108. In general, as shown, the scheduler 112 may include an entry generator 132 which is configured to populate the scheduler entries 118 and the time windows 120, using the tasks 114 and the schedules 116. As also shown, the scheduler 112 may include an execution engine 134 which is configured to perform actual executions of tasks in accordance with corresponding schedules thereof, and based on use of the time windows 120.

In more detail, with respect to the entry generator 132, as just referenced, the tasks 114 and the schedules 116 may be utilized to create the scheduler entries 118 and the time windows 120. In this regard, it may be appreciated that the tasks 114 and the schedules 116 may be received from some external source, not specifically illustrated in the example of FIG. 1, and may be specified to varying levels or in varying manners. For example, schedules and tasks may be received from an administrator or other user of the system 100, or from another system. In other examples, schedules and/or tasks may be populated automatically, e.g., based on outcomes of previously-executed tasks.

In the example of FIG. 1, the schedules 116 may be specified using various scheduling rules and/or algorithms. For example, in example embodiments, the schedules 116 may specify schedules in an indirect or incomplete manner, with respect to some external event or other criteria. For example, the schedules 116 may specify a plurality of alternative schedules, with the intent that a particular schedule be selected based on corresponding criteria that may exist at a time of evaluation of the alternative schedules.

In particular, the individual tasks of the tasks 114 may specify particular parameters defining a desired time, nature, or other characteristic of the resulting task execution. For example, tasks may be specified as requiring certain inputs, or may be specified for execution relative to, or in conjunction with, other executing tasks. Thus, the scheduler evaluator 136 may be configured to evaluate the corresponding schedules 116, in accordance with relevant scheduling rules/algorithms, in order to determine an actual schedule instance for each task to be executed. In this way, the scheduler entries 118 may be populated with specific instances of schedules and associated upcoming invocations for tasks to be executed.

Thus, the entry generator 132 is illustrated as including a schedule evaluator 136. As may be appreciated from the above description, the schedule evaluator 136 may be configured to access the schedules 116, and to process the schedules 116 in accordance with corresponding tasks and using any existing or appropriate scheduling rules/algorithms. In this way, the schedule evaluator 136 may provide specific instances of the schedules to be used in conjunction with one or more specific tasks to be executed, including an upcoming task invocation according to the schedule.

Once the scheduler entries 118 have been created in this manner, a time window calculator 138 may be utilized to assign each of the scheduler entries 118 to a corresponding time window of the time windows 120. In this regard, as with the schedules 116 and the tasks 114, it may be appreciated that the time windows 120 themselves may be defined by an administrator or other user of the system 100. As already described, the time windows 120 may be defined in a variety of manners, but for the sake of simplicity, the following example time windows in the present description are defined as single-minute time windows.

Thus, the time window calculator 138 may be configured to input a particular scheduler entry from the scheduler entries 118, and to assign this scheduler entry to a corresponding time window of the time windows 120. For example, the scheduler entry selected may be associated with a task scheduled for execution within a particular minute of a particular day/date. Then, the time window calculator 138 may simply calculate a modulus of the scheduled execution time, to be correlated with a particular time window of the time windows 120.

As referenced above, multiple ones of the scheduler entries 118 may thus be assigned to each time window of the time windows 120. Then, within each such time window, the included scheduler entries may be stored as a linked list of scheduler entries.

In this regard, a linked list modifier 140 may be configured to create the linked list 126 of associated scheduler entries included in conjunction with the particular time window key 124 and associated time window. For example, as described in more detail below, the linked list modifier 140 may be configured to receive each scheduler entry of a corresponding time window, and thereafter either append or prepend the selected scheduler entry to the (existing) linked list 126.

A lock manager 142 may be utilized in conjunction with lock support functionalities provided by the data distribution manager 108, in order to ensure that no overlapping or conflicting modifications of the key-value store 110 occur during the previously described operations of components 136, 138, 140. Further example operations of the lock manager 142 in this regard are described in more detail below, e.g., with respect to FIG. 4.

Once the various scheduler entries 118 have been created and stored within linked lists associated with specific time windows as just described, the execution engine 134 may proceed with actual executions of the referenced tasks. In particular, as referenced above and by nature of the distributed system 100, it may occur that the various tasks 114 are executed at various, appropriate ones of the nodes 102-106. Thus, during execution, an entry reader 146 may read scheduler entries from corresponding linked lists of the time windows 120 into the in-flight map 128 in conjunction with an identification of a corresponding node on which the task in question will be executed. In such examples, then, the in-flight map 128 may be understood to represent scheduler entries read into memory from the time windows 120 and associated with a specific, corresponding node on which the corresponding task will be executed.

Thereafter, the entry reader 146 may read the scheduler entries from the in-flight map 128 into the execution queue 130 of the particular node at which execution is to occur, at an appropriate time corresponding to a scheduled execution/invocation of the task(s) in question. Thereafter, task execution may proceed simply by loading scheduler entries in order from the appropriate execution queue 130.

As with the entry generator 132, the execution engine 134 may include a lock manager 148 which may be configured to operate in conjunction with locking functionality of the data distribution manager 108. Specifically, and similarly, the lock manager 148 may be configured to ensure that overlapping or conflicting execution attempts do not occur with respect to specific scheduler entries. Additional examples of operations of the lock manager 148 are provided in detail below, e.g., with respect to FIG. 5.

In a distributed system such as the distributed system 100, it may occur that individual computing nodes experience partial or complete operational failures. Such node failures may occur at unexpected times and in unexpected manners. Consequently, it may occur that scheduler entries read into the in-flight map 128 may be associated with an individual node which experiences such a node failure. In such scenarios, the relevant scheduler entries may be considered to be orphaned, since the scheduler entries are scheduled for execution on a non-existent or unavailable node.

In the example of FIG. 1, the scheduler 112 thus includes a cluster coordinator 150 which may be configured, periodically or in response to a specific request, to inspect the in-flight map 128 for the existence of such orphaned entries. Upon discovery of one or more orphaned entries, the cluster coordinator 150 may be configured to reassign the orphaned entry to a different node, for execution of the associated task at the earliest opportunity, and/or in accordance with a relevant, corresponding schedule.

In some instances, it may occur that an orphaned entry has become obsolete, and/or may no longer require execution of the associated task. In such cases, the cluster coordinator 150 may be configured to determine that the task is no longer required, and to remove the corresponding scheduler entry from the time windows 120. Somewhat similarly, the cluster coordinator 150 may determine that a corresponding task should still be completed, but should be completed in accordance with a relevant schedule, rather than at the earliest opportunity for execution thereof. In such cases, the cluster coordinator 150 may communicate with the scheduler evaluator 136, if needed, in order to re-compute the associated schedule, and to otherwise regenerate an appropriate scheduler entry for inclusion within the time windows 120.

As referenced above, although the components 108-112 and associated components are illustrated only in the example of the node 102, it may be appreciated that some or all of the various components of the node 102 may be implemented using some or all of the various remaining nodes 104, 106 of the distributed system 100. In particular, the key-value store 110 may be understood, as described herein, to represent a distributed key-value store, so that scheduler entries created in the time windows 120 of the node 102 may be included in an in-flight map that is itself distributed as part of the distributed key-value store 110, and ultimately read into an associated execution queue, e.g., of the node 106, when the corresponding tasks are scheduled for execution using the node 106. Thus, it may be appreciated that an entry generator of a first node may be responsible for creating time windows and associated linked lists of scheduler entries at that node, while an execution engine of a separate scheduler of a separate node may be responsible for actually executing an appropriate subset of the created scheduler entries.

In this regard, and as also referenced above, the distributed system 100 may include a large number of computing nodes. In order to organize and otherwise manage such a large number of nodes, the various nodes may be grouped into subsets of nodes, defined as clusters. For example, the nodes 102-106 may represent such a cluster of a larger distributed system of nodes.

In such context, although the cluster coordinator 150 is illustrated in the context of the node 102, it may be understood to represent a component which may be installed on a subset of nodes of a particular cluster, or of all nodes of the cluster, and which is configured to execute certain functionalities with respect to the nodes of that cluster. In this way, redundancy may be provided in case of a node failure of a node executing the cluster coordinator 150. In particular, with respect to the functionalities of the cluster coordinator 150 described above, the cluster coordinator 150 may be responsible for monitoring the distributed in-flight map for all of the nodes 102-106 of the cluster, and may further be configured to maintain a current operational status of all nodes of the cluster. In this way, for example, the cluster coordinator 150 may determine that the node 106 has become unavailable, so that, upon detection of an orphaned scheduler entry associated with the node 106 within the in-flight map 128, the cluster coordinator 150 may proceed with the above-described operations and support of rescheduling or otherwise resolving a corresponding task execution of the orphaned scheduler entry, e.g., by reassigning the orphaned scheduler entry to one of the remaining, available nodes 102, 104.

More generally, it may be appreciated that all of the components 102-150 of FIG. 1 are illustrated and described with respect to specific features and functions, but that such features and functions may be obtained through the use of a wide variety of underlying hardware/software platforms, and various configurations thereof, not all of which are necessarily or specifically described in the example of FIG. 1. For example, in variations of the example of FIG. 1, any single component may be implemented using two or more subcomponents, executed at the same or different node(s) of the distributed system 100. Similarly, but conversely, any two or more separate components may be implemented using a single, combined component which provides all of the relevant or desired aspects of the two or more components.

In particular, with respect to the nodes 102-106 themselves, it may be appreciated that such nodes may represent virtually any computing device suitable for processing the types of tasks described herein. For example, such nodes may include, without limitation, various desktop, laptop, notebook, netbook, or tablet computers, as well as various other mobile computing platforms, (e.g., Smartphones), as well as computer/network workstations.

Consequently, all such nodes may include any such standard or desired hardware/software features which may be utilized to implement the system 100. In particular, for example, as illustrated with respect to the node 102, nodes may include at least one processor 102a and corresponding computer readable storage medium 102b, where the computer readable storage medium 102b may be utilized to store instructions which, when executed by the at least one processor 102a, convert the node 102 into a special purpose node configured to provide the various features and functions described herein with respect to the scheduler 112.

More generally, the compute readable storage medium 102b, or variations thereof, also may represent any of the various types of memory which may be used to store and access data, such as may be used to implement the key-value store 110 or illustrated components thereof, as well as the execution queue 130. Even more generally, the node 102 may be understood to include many other components associated with the above-referenced computing platforms, and variations thereof, including, e.g., various hardware and associated software elements associated with executing communications within and among the nodes 102-106. Again, such variations of the system 100 perhaps specifically illustrated in the example of FIG. 1, but would be apparent to one of skill in the art.

Figure 2:
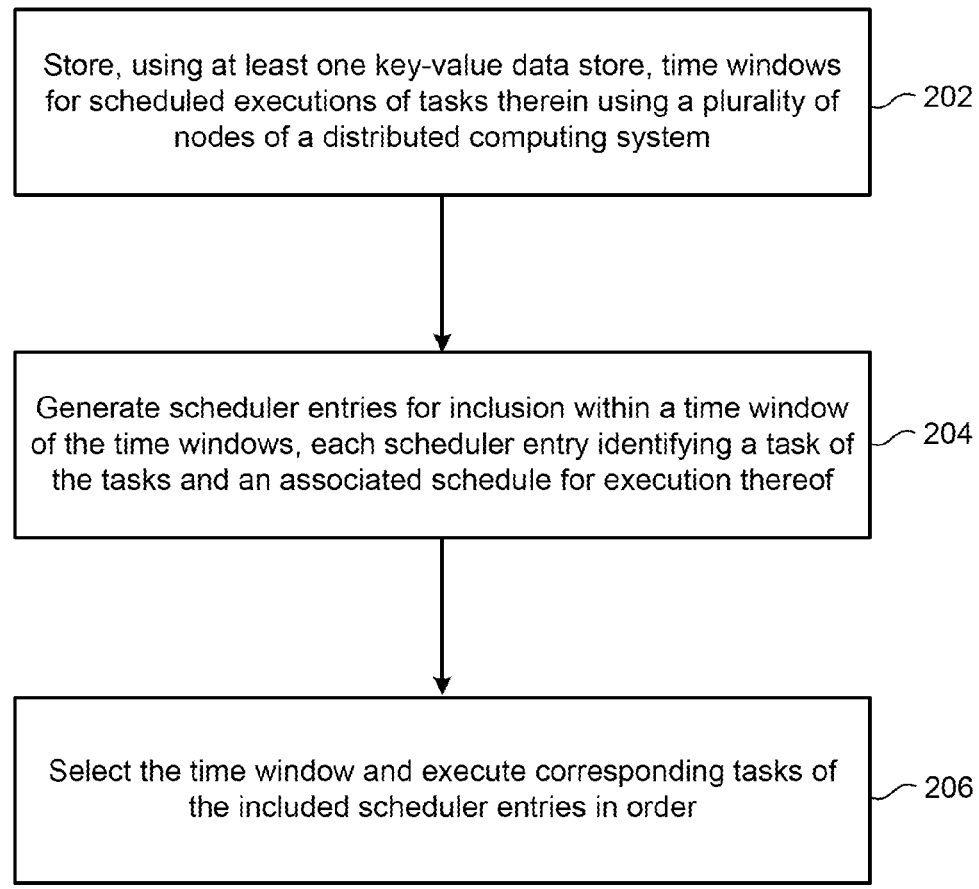
FIG. 2 is a flowchart illustrating example operations of the system of FIG. 1.

FIG. 2 is a flowchart 200 illustrating example operations of the system 100 of FIG. 1. In the example of FIG. 2, operations 202-206 are illustrated as separate, sequential operations. However, it may be appreciated that the operations 202-206 may be performed in a different order than that shown, e.g., in a nested, iterative, or looped fashion. Further, the operations 202-206 may be performed in a partially or completely overlapping or parallel manner. Further, additional or alternative operations may be included, and one or more of the operations 202-206, or portions thereof, may be omitted in some example embodiments.

In the example of FIG. 2, using at least one key-value data store, time windows may be stored for scheduled execution of tasks therein using a plurality of nodes of a distributed computing system (202). For example, the entry generator 132 may be configured to store the time windows 120, as described above with respect to FIG. 1.

Scheduler entries may be generated for inclusion within a time window of the time windows, each scheduler entry identifying a task of the tasks and an associated schedule for execution thereof (204). For example, the entry generator 132 may be configured to generate the scheduler entries 118, using the tasks 114 and the corresponding schedules 116, as described above. The time window calculator 138 may be configured to associate particular scheduler entries with the specific time window for inclusion therein, e.g., as the linked list 126.

Then, the time window may be selected, and the included scheduler entries and corresponding tasks thereof may be executed in order (206). For example, the execution engine 134 may be configured to load scheduler entries associated with a current time window (e.g., the time window 124, as identified by current time 122) into the in-flight map 128, and thereafter into the execution queue 130.

Figure 3:
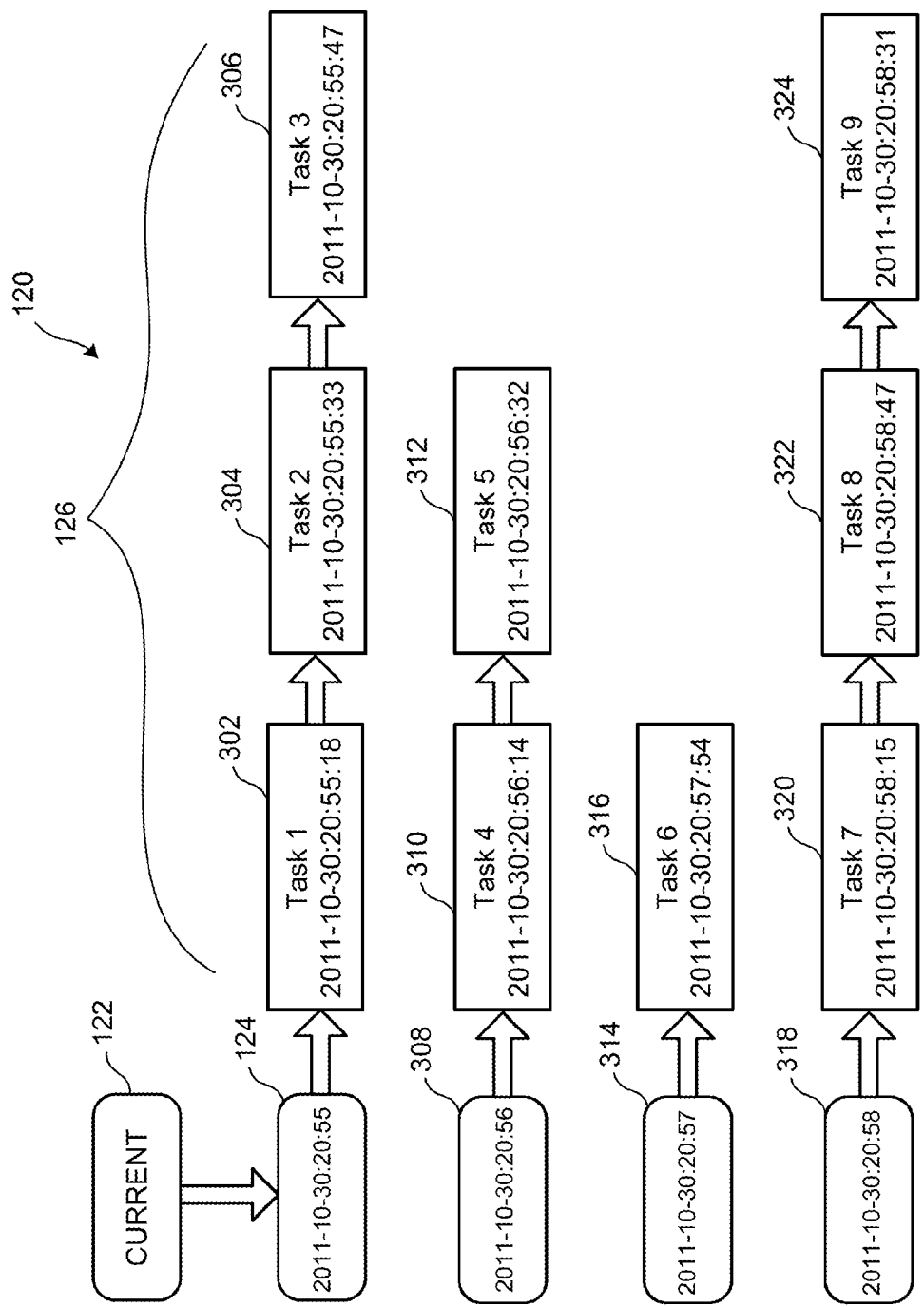
FIG. 3 is a block diagram of an example data structure used in the system of FIG. 1.

FIG. 3 is a block diagram of example data structures used in the example of FIGS. 1 and 2. More specifically, FIG. 3 illustrates example structure and content of the time windows 120 of the example of FIG. 1.

In FIG. 3, the current time data entry 122 is illustrated as pointing to the time window key 124, which, in the example of FIG. 3, includes an example time stamp of 2011-10-30:20:55, and thereby identifies a particular one minute time window of the plurality of one minute time windows 120. As illustrated in FIG. 3, and as referenced above in the example of FIG. 1, the time window key 124 points to the linked list of scheduler entries 126. More specifically, in the example of FIG. 3, the linked list 126 includes tasks 302, 304, 306. As shown, each of the tasks 302-306 is identified as occurring within the relevant time window 124.

Similar comments apply to a subsequent time window 308, having value 2011-10-30:20:56, which includes a linked list of tasks 310, 312. A time window 314 having value 2011-10-30:20:57 includes a single task 316. Finally in the example of FIG. 3, a final time window 318 having value 2011-10-30:20:58 identifies a linked list of tasks 320, 322, 324.

Thus, FIG. 3 illustrates example data structures that may be created and used in the context of the examples of FIGS. 1 and 2. Additional details and more specific examples regarding the creation and use of the data structures of FIG. 3 are provided below, in the context of FIGS. 4-6.

Figure 4:
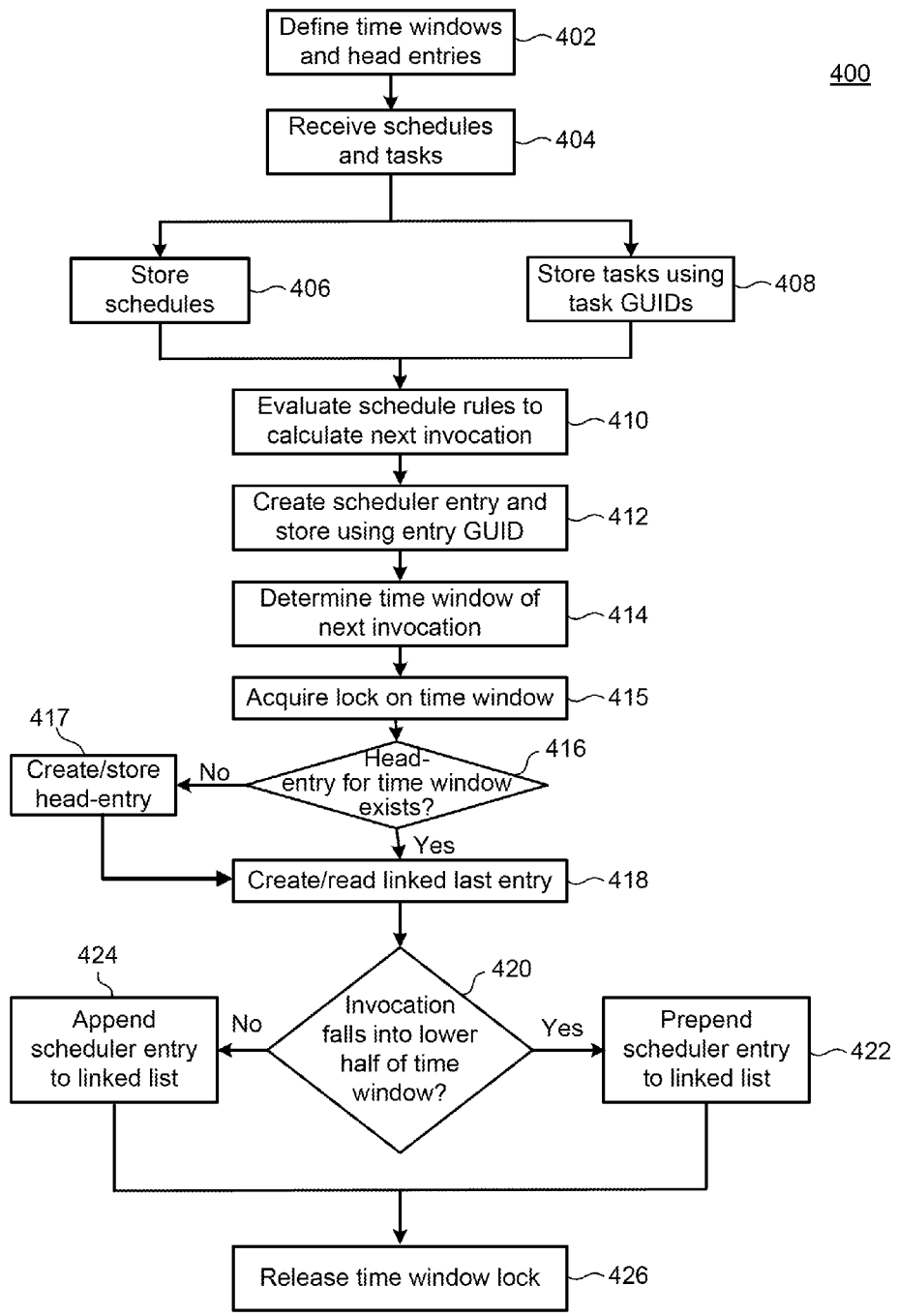
FIG. 4 is a flowchart illustrating more detailed example scheduling operations implemented using the system of FIG. 1.

Specifically, FIG. 4 is a flowchart 400 illustrating example operations for scheduling a task in the context of the data structures of FIG. 3. In the example of FIG. 4, time windows and associated head entries may initially be defined (402). For example, the time windows 120 may be defined as being one minute (or other appropriate duration) in length, and associated head entries having corresponding time stamps identifying a beginning of each time window may be stored. Specifically, as described, the time stamp of each head entry may be used as a key for storage of the corresponding time window within the key-value data store 110.

As referenced above with respect to FIG. 1, such definition of appropriate time windows may be received from an administrator or the user of the system 100. For example, the node 102 may be directly or indirectly associated with a graphical user interface (GUI) and associated software for allowing the administrator to enter information regarding the time windows. In additional or alternative example embodiments, the time windows may be calculated by the scheduler 112 based on some external information that may be received, e.g., from one of the remaining nodes 104, 106, or from some other external source that is in communications with the node 102.

Somewhat similarly, schedules 116 and tasks 114 may be received from the administrator or other user/system, e.g., using the appropriate GUI, and/or may be calculated or otherwise determined from information communicated to the node 102 from one of the remaining nodes 104, 106, or from some other external source (404).

Storing of the schedules 116 (406) and the tasks 114 using the task GUID 114A (408) may then proceed. For example, as described, the scheduler 112 may be configured to store the tasks 114, the schedules 116, and the time windows 120, using the key-value data store 110. As also described, the tasks 114 may include pointers or other references to actual task data, which may be stored at a different location and/or using a different memory, so as to minimize quantities of data transfer during operations of the system 100.

Schedule rules associated with the schedules 116 may be evaluated in order to determine a next, upcoming indication of a task in accordance with its corresponding schedule (410). For example, the schedule evaluator 136 may be configured to utilize available scheduling rules/algorithms to evaluate each of the schedules 116, as described above. In this way, the schedule evaluator 136 may determine the next/upcoming scheduled instance of execution of a corresponding task.

The entry generator 132 may thus generate the corresponding scheduler entries 118 (412), which may be stored in the key-value data store 110 using corresponding entry GUIDs 118A as keys. As described, each scheduler entry identifies a schedule and associated schedule definition, as well as the corresponding task to be executed.

Then, the time window calculator 138 may compute the appropriate time window, i.e., the time window in which the time of invocation for a given task falls (414). In the example, the time window calculator 138 may calculate the appropriate time window simply by taking a modulus of the time stamp of the task in question (where the modulus is equivalent to the granularity of the time window). For example, with respect to the task 302, it may be observed that the scheduled invitation for the task 302 is at the time 2011-10-30:20:55:18. Consequently, taking the modulus of this time stamp results in the time 2011-10-30:20:55, which is the value of the time window key 124.

The lock manager 142 may then be used to communicate with the data distribution manager 108 to require a lock on the determined time window for corresponding scheduler entry (415). As described, such a lock prevents other nodes of a distributed system 100 from reading/writing to the time window in question, while the lock is in existence.

Once the lock has been acquired, the linked list modifier 140 may create a head-entry for the time window (417) if the head-entry does not already exist (416). Afterwards, or, if the head-entry does already exist (416), the linked list modifier 140 may proceed to read the included linked list within the relevant time window, or may create a linked list if necessary (418). To give a specific example, it may occur that the task 304, at a given point in time, is the only task included within the time window 124, and that the tasks 302, 306 are currently being processed for inclusion within the time windows 120. Then, with respect to the task 302, it may be appreciated that the entry generator 132 may determine the illustrated invocation time of 2011-10-30:20:55:18 at operation 410, create a corresponding scheduler entry for the task 302 at operation 412, determine inclusion of the task 302 within the time window 124 at operation 414, require a lock on the time window 124 at operation 416, and then read the existing linked list entry associated with the task 304 at operation 418.

Then, if the indication of the task according to its time stamp falls into a lower half of the time window (420), the scheduler entry may be prepended to the linked list (422). For example, as shown, the timestamp of the task 302 of 2011-10-30:20:55:18 falls into a lower half of the time window 2011-10-30:20:55, and is therefore prepended, or attached before or prior to the task 304 within the linked list 126. In contrast, however, with respect to the task 306 (where it may be appreciated that operations 410-418 will have been similarly performed), the scheduled invocation time of 2011-10-30:20:55:47 falls into an upper half of the time window 124, so that the corresponding scheduler entry is added after or following the task 304, i.e., is appended to an end of the linked list 126 (424). Although not specifically illustrated in the example of FIG. 4, it may be appreciated that if no entry is currently included, then the current entry may be included as the first entry.

By building the linked list 126 in this manner, scheduler entries may be approximately sorted, to provide a relative improvement in the precision of the task scheduling. As a result, a maximum discrepancy between desired and actual execution times is approximately half of the time window. That is, for example, it may be observed that if a fourth task to be added to the linked list 126 which is scheduled to be invoked, at, e.g., 2011-10-30:20:55:25, then this task would be pre-pended to the linked list 126 prior to the task 302, notwithstanding the fact that the scheduled indication of the fourth task is actually scheduled for a time subsequent to the scheduled indication of the task 302. Nonetheless, as just described, such discrepancies are limited to half of the time window, and should provide little or no negative impact to later sorting efforts associated with accurately/completely sorting the scheduler entries (as described below), depending on a current load of the system 100. Consequently, such discrepancies may be minor in effect relative to the gains and speeds and efficiency obtained through the use of the techniques described herein. Nonetheless, such discrepancies could be minimized further, e.g., by selecting a smaller time window.

Once the linked list has been updated, the relevant time window lock may be released (426). The process 400 may be repeated until the entirety of the data structure of FIG. 3 is completed.

In the example of FIGS. 1-3, the described linked list, e.g., the linked list 126, may easily be implemented by requiring that each scheduler entry keep an attribute with the key (e.g., the entry GUID) of the next scheduler entry. Further, the head entry of the linked list also may include an attribute identifying a current last entry in the list, so that the above-described operations of appending a currently considered scheduler entry to an end of a relevant linked list may be implemented easily.

Figure 5:
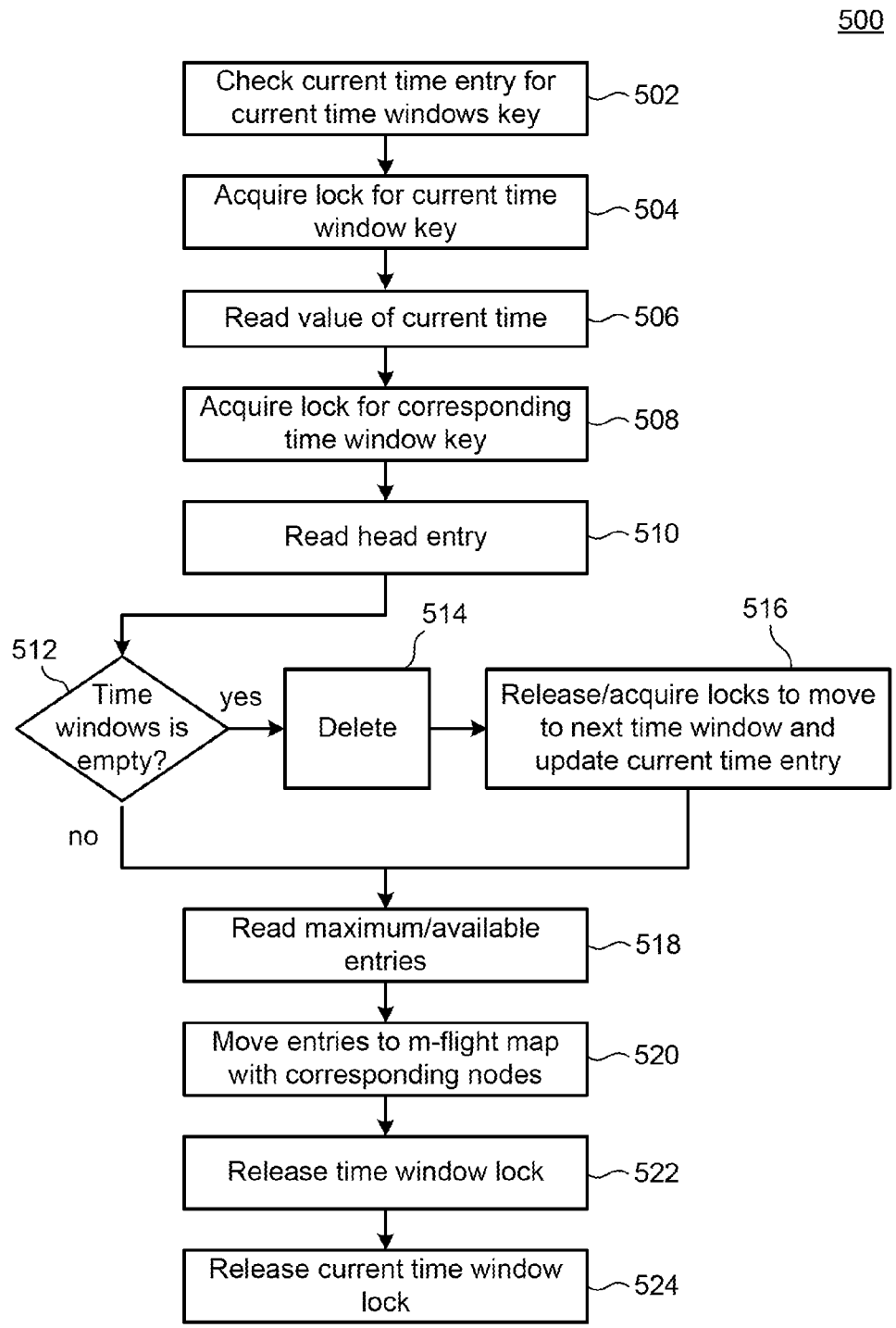
FIG. 5 is a flowchart illustrating more detailed example operations for identifying tasks for execution using the system of FIG. 1.
Figure 6:
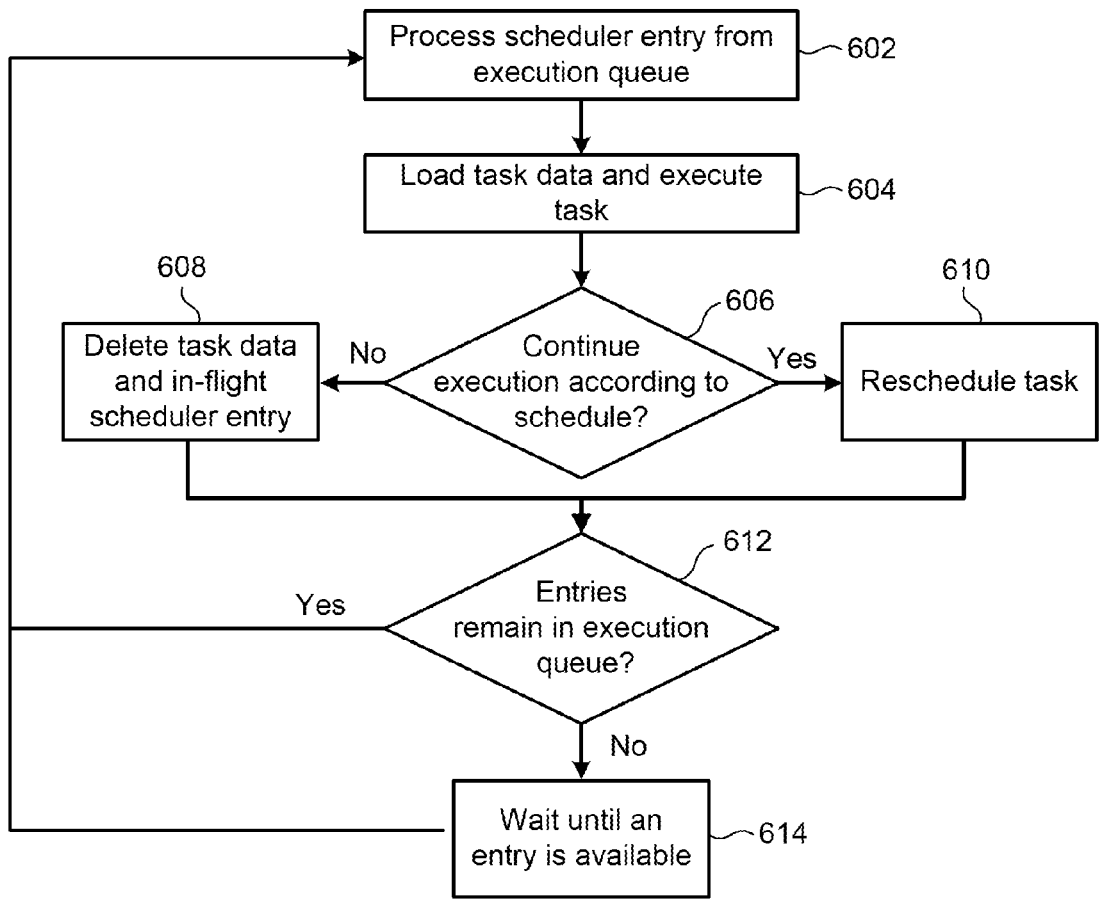
FIG. 6 is a flowchart illustrating more detailed example execution operations for executing tasks in the system of FIG. 1.

FIGS. 5 and 6 are flowcharts 500 and 600 illustrating example operations related to the executions of tasks in the example context of FIGS. 1-4. More specifically, FIG. 5 is a flowchart 500 illustrating example operations related to the inclusion of scheduler entries within the in-flight map 128, while FIG. 6 is a flowchart 600 illustrating operations related to the actual executions of the tasks loaded from the execution queue 130.

In general, with respect to FIGS. 5 and 6, the execution engine 134 of the scheduler 112 may be configured to load scheduler entries from the time windows 120 into the in-flight map 128 at a set interval (e.g., every 10 seconds). The execution engine 134 may be configured to keep only a certain number of scheduler entries in memory and the in-flight map 128 at any given time, so that when a number of scheduler entries within the in-flight map 128 falls below this threshold, the execution engine 134 will load additional scheduler entries from the time windows 120 into the in-flight map 128.

Once the scheduler entries are loaded in the in-flight map 128, the execution engine 134 may sort the corresponding tasks according to their actual schedule indications, so as to resolve any of the discrepancies in the order of execution described above with respect to FIG. 4. The execution engine 134 may then dispatch scheduler entries from the in-flight map 128 to the execution queue 130 as the scheduled indication times of each corresponding task arrives.

In this way, the execution engine 134 may ensure that the tasks never run too early, although it is possible that a given task may run later than its intended time, such as when the task is loaded from the time windows 120 after its scheduled execution time, in which case the task may be invoked late, or may otherwise be omitted, modified, or handled in a desired fashion, as described herein.

Specifically with respect to FIG. 5, and with respect to the example of FIG. 3, the process 500 may begin with the checking of the current time entry for a current time window key (502). For example, the entry reader 146 of the execution engine 134 may read the current time key 122 to determine the actual (in the example) current time window 124. As described, the current time window entry 122 represents a special entry in the key-value data store 110 which holds the key of the current time window 124 being read. As also described, in scenarios in which the system 100 is lagging due to the presence of a heavy workload, then the current time window entry 122 may actually point to a time window which is lagging a current time.

Then, the lock manager 148 of the execution engine 134 may acquire a lock for the current time window key 122 (504). Once the lock is acquired, the entry reader 146 may read the value of the current time window 124 (506). Then, the lock manager 148 may acquire a lock for the corresponding time window key 124 (508).

A head entry of the time window 124 may be read (510) by the entry reader 146. As described, the head entry generally includes a pointer to a beginning of the linked list 126, so that the entry reader 146 may subsequently read therefrom.

However, in examples in which the relevant time window is empty (512), then the execution engine 134 may simply delete the time window (514). Then, the execution engine 134 may simply move to a subsequent time window (assuming that a current time has passed the end of the time window to be deleted). Then, by updating the current time entry 122 and releasing/acquiring locks as necessary, the execution engine 134 may proceed to a next-available time window which includes a linked list of scheduler entries. In particular, in scenarios in which the time window in question has a value that is less than an actual current time (e.g., the system is lagging behind due to heavy load), these operations may continue iteratively until the time window of the actual current time is reached (or until a maximum number of entries has been reached).

Upon reaching a time window which contains a linked list of scheduler entries, the entry reader 146 may proceed to read the scheduler entries therefrom (518). More specifically, the entry reader 146 will read sufficient scheduler entries to reach a maximum limit for the number of entries that may be kept in an in-flight map 128 of a given node (e.g., 100 entries), or until all scheduler entries scheduled for the time window in question have been read.

For example, in a highly simplified example, a maximum limit for scheduler entries may have a value of 2, so that the entry reader 146, when reading the linked list 126 from the time window 124, would load only the tasks 302, 304 to the in-flight map 128, and would then load the remaining task 306 during a subsequent iteration. On the other hand, if the maximum limit were higher than 2, then the entry reader 146 would read all of the tasks 302-306 from the linked list 126 into the in-flight map 128.

Specifically, after reading the maximum/available number of scheduler entries from the relevantly linked list of the time window in question, the entry reader 146 may proceed to move the read entries to the in-flight map 128, in conjunction with an identification of corresponding nodes on which the tasks of the scheduler entries are to be executed (520). In so doing, the entry reader 146 may read scheduler entries from a beginning of the linked list 126, meaning that scheduler entries in the lower half of the time window 124 will be read before scheduled entries in the upper half of the time window 124. In practice, entries read may not be deleted from storage within the key-value data store 110, but rather may be moved logically to the in-flight map 128, which may be implemented in the context of the key-value data store 110 itself.

Subsequently, the lock manager 148 may release the time window lock on the time window 124 (522), and may release the lock on the current time window 122 (524), as well. Then, operations of the flowchart 500 may proceed iteratively until a maximum number of scheduler entries within the in-flight map 128 has been reached, and/or whenever a current number of scheduler entries within the in-flight map 128 falls below the preconfigured minimum threshold.

As referenced above, FIG. 6 illustrates a flowchart 600 which shows the example processing of scheduler entries from the execution queue 130, as well as any associated post processing of executed scheduler entries. Specifically, as referenced above, the entry reader 146 may be configured to load entries from the in-flight map 128 into the execution queue 130, as the relevant time arrives for each task to be executed (602). In this way, upon reading of the scheduler entries from the execution queue 130, the execution engine 134 may proceed to load task data from its storage site and complete a corresponding execution of the task (604).

Then, with respect to the executed task, the execution engine 134 may determine whether the task requires any subsequent executions, according its associated schedule (606). If the executing task does not signal a requirement for such subsequent scheduled executions, then the task data and associated in-flight scheduler entry may be deleted (608).

On the other hand, if the execution of the task results in a single that there will be additional, future indications of the task in accordance with the original schedule (606), then the execution engine 134, perhaps in conjunction with the entry generator 132, may proceed to reschedule the task as described above with respect to FIG. 5 (610).

The process 600 may continue as long as entries remain in the execution queue 130 (612). Otherwise, the process 600 may wait until an entry is available within the execution queue (614).

Further, if a node in the system 100 experiences node failure while processing tasks loaded from the key-value data store 110, such failure will be detected by the cluster coordinator 150, which is configured to continuously monitor the in-flight maps 128 for scheduler entries which have been orphaned due to such failures. For example, such scheduler entries will be marked as having been orphaned by being marked as being processed by a node that is no longer an active cluster member. Then, as described, such scheduler entries that have been orphaned will be moved back to the current time window to get processed as soon as possible by another appropriate node, or to otherwise be deleted, modified, or handled as described herein. If a large portion of the system 100, or the entire system 100, were to experience failure, then a similar process may be utilized to move all scheduler entries in the in-flight map 128 back to the current time window for rescheduling thereof.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A scheduling system for scheduling executions of tasks within a distributed computing system, the scheduling system including:
   at least one processor; and
   a non-transitory computer readable storage medium storing instructions, which, when executed by the at least one processor implement
   an entry generator configured to cause the at least one processor to store, using at least one key-value data store, time windows for scheduled executions of tasks therein using a plurality of nodes of the distributed computing system, each time window being stored as a time window data structure in conjunction with a time window key within the key-value store, and further configured to cause the at least one processor to generate scheduler entries, each scheduler entry being stored as a scheduler entry data structure in conjunction with a scheduler entry key within the key-value store and including a corresponding task of the tasks and an associated schedule for execution thereof, wherein each time window data structure is initially stored separately from each scheduler entry data structure, and the entry generator is configured to cause the at least one processor to calculate, for a selected task and based on its associated schedule, an upcoming task invocation and an associated, selected time window in which the upcoming task invocation falls, for storage of the upcoming task invocation therein; and an execution engine configured to cause the at least one processor to execute the selected task within the selected time window within the distributed computing system, wherein the entry generator is further configured to cause the at least one processor to assign the scheduler entry and associated upcoming task invocation to the selected time window of the time windows, including calculating a granularity of an invocation time of the associated upcoming task invocation to correlate with a timestamp of the selected time window, and wherein the execution engine is further configured to cause the at least one processor to read the upcoming task invocation for the selected task to an in-flight map when a current time equals the time stamp of the selected time window, and in response thereto, sort the upcoming task invocation according to actual scheduled task invocations within the selected time window as to resolve any discrepancies.

2. The system of claim 1, wherein the entry generator is configured to store each time window of the time windows within the at least one key-value data store, using a time stamp of a beginning of each time window as the time window key for the corresponding time window.

3. The system of claim 1, wherein the entry generator is configured to store each task of the tasks within the at least one key-value data store, using a corresponding unique task identifier as the time window key, and including a pointer to associated task data.

4. The system of claim 1, wherein the entry generator is configured to assign the scheduler entries to corresponding time windows including calculating a modulus of each invocation time of each upcoming task invocation to obtain a time corresponding to a time stamp of one of the time windows.

5. The system of claim 1, wherein the entry generator is configured to include the scheduler entries within the time window including creating a linked list of task invocations of scheduler entries within the selected time window.

6. The system of claim 5, wherein the entry generator is configured to add new task invocations to the linked list, including prepending or appending each new task invocation to the linked list in accordance with a determination that the new task invocation falls into a lower half or upper half, respectively, of the selected time window.

7. The system of claim 1, wherein the entry generator includes a lock manager configured to acquire a lock on the selected time window of the time windows during a time of write operations executed with respect to including the upcoming task invocation therein.

8. The system of claim 1, wherein the execution engine includes an entry reader configured to read the upcoming task invocation from the selected time window for inclusion within the in-flight map of scheduler entries to be executed, in association with corresponding nodes of the plurality of nodes on which the corresponding tasks are assigned for execution.

9. The system of claim 8, wherein the entry reader is configured to read a preconfigured maximum number of task invocations from the time window to the in-flight map.

10. The system of claim 8, wherein the execution engine is configured to read task invocations from the in-flight map to an execution queue for execution of associated tasks at corresponding invocation times thereof.

11. The system of claim 1, further comprising a cluster coordinator configured to identify scheduler entries having task invocations scheduled for execution on an unavailable node of the plurality of nodes, and further configured to regenerate corresponding task invocations therefore within a new time window of the time windows.

12. A method comprising:

storing, using at least one key-value data store, time windows for scheduled executions of tasks therein using a plurality of nodes of a distributed computing system, each time window being stored as a time window data structure in conjunction with a time window key within the key-value store;

generating scheduler entries, each scheduler entry being stored as a scheduler entry data structure in conjunction with a scheduler entry key within the key-value store and including a corresponding task of the tasks and an associated schedule for execution thereof, wherein each time window data structure is initially stored separately from each scheduler entry data structure, calculating, for a selected task and based on its associated schedule, an upcoming task invocation and an associated, selected time window in which the upcoming task invocation falls, for storage of the upcoming task invocation therein;

assigning the scheduler entry and associated upcoming task invocation to the selected time window of the time windows, including calculating a granularity of an invocation time of the associated upcoming task invocation to correlate with a timestamp of the selected time window;

reading the upcoming task invocation for the selected task to an in-flight map when a current time equals the time stamp of the selected time window;

sorting, in response to the reading, the upcoming task invocation according to actual scheduled task invocations within the selected time window as to resolve any discrepancies; and executing the selected task within the selected time window and within the distributed computing system.

13. The method of claim 12, wherein the scheduler entries are included within the selected time window as a linked list of task invocations of scheduler entries.

14. The method of claim 12, wherein execution of the upcoming task invocation includes reading the upcoming task invocation from the selected time window for inclusion within the in-flight map of task invocations to be executed, in association with corresponding nodes of the plurality of nodes on which the corresponding task invocations are assigned for execution.

15. A computer program product including instructions recorded on a non-transitory computer readable storage medium and configured to cause at least one processor to:

store, using at least one key-value data store, time windows for scheduled executions of tasks therein using a plurality of nodes of a distributed computing system, each time window being stored as a time window data structure in conjunction with a time window key within the key-value store;

generate scheduler entries, each scheduler entry being stored as a scheduler entry data structure in conjunction with a scheduler entry key within the key-value store and including a corresponding task of the tasks and an associated schedule for execution thereof, wherein each time window data structure is initially stored separately from each scheduler entry data structure, calculate, for a selected task and based on its associated schedule, an upcoming task invocation and an associated, selected time window in which the upcoming task invocation falls, for storage of the upcoming task invocation therein;

assign the scheduler entry and associated upcoming task invocation to the selected time window of the time windows, including calculating a granularity of an invocation time of the associated upcoming task invocation to correlate with a timestamp of the selected time window;

read the upcoming task invocation for the selected task to an in-flight map when a current time equals the time stamp of the selected time window;

sort, in response to the reading, the upcoming task invocation according to actual scheduled task invocations within the selected time window as to resolve any discrepancies; and execute the selected task within the selected time window and within the distributed computing system.

16. The computer program product of claim 15, wherein the scheduler entries are included within the selected time window as a linked list of task invocations of scheduler entries.

17. The computer program product of claim 15, wherein the upcoming task invocation is read from the selected time window for inclusion within the in-flight map of task invocations to be executed, in association with corresponding nodes of the plurality of nodes on which the corresponding task invocations are assigned for execution.

* * * * *